(12) United States Patent
Noh et al.

(10) Patent No.: US 7,473,408 B2
(45) Date of Patent: Jan. 6, 2009

(54) METHOD FOR PREPARING SINGLE CRYSTALLINE CERIUM OXIDE POWDERS

(75) Inventors: Jun-Seok Noh, Daejeon (KR);
Tae-Hyun Kwon, Daejeon (KR);
Seung-Beom Cho, Daejeon (KR);
Hye-Jeong Hong, Daejeon (KR);
Dae-Gon Han, Daejeon (KR)

(73) Assignee: LG Chem, Ltd. (KR)

( * ) Notice: Subject to any disclaimer, the term of this patent is extended or adjusted under 35 U.S.C. 154(b) by 288 days.

(21) Appl. No.: 10/482,625

(22) PCT Filed: Apr. 14, 2003

(86) PCT No.: PCT/KR03/00756

§ 371 (c)(1),
(2), (4) Date: Dec. 30, 2003

(87) PCT Pub. No.: WO03/089374

PCT Pub. Date: Oct. 30, 2003

(65) Prior Publication Data

US 2004/0241070 A1 Dec. 2, 2004

(30) Foreign Application Priority Data

Apr. 15, 2002 (KR) .................. 10-2002-0020407

(51) Int. Cl.
*C01F 17/00* (2006.01)
(52) U.S. Cl. ..................... 423/263; 502/304
(58) Field of Classification Search ............. None
See application file for complete search history.

(56) References Cited

U.S. PATENT DOCUMENTS 2,523,892 A * 9/1950 Warf .................. 423/21.1

| | | | |
|---|---|---|---|
| 5,879,715 A * | 3/1999 | Higgins et al. | 424/489 |
| 5,938,837 A | 8/1999 | Hanawa et al. | 117/68 |
| 6,372,003 B1 * | 4/2002 | Kasai et al. | 51/309 |
| 6,387,139 B1 * | 5/2002 | Kido et al. | 51/309 |
| 6,596,042 B1 * | 7/2003 | Feng et al. | 51/309 |
| 6,887,566 B1 * | 5/2005 | Hung et al. | 428/357 |

FOREIGN PATENT DOCUMENTS

| EP | 0 300 852 A1 | 1/1989 |
|---|---|---|
| JP | 64065019 A | 3/1989 |

(Continued)

OTHER PUBLICATIONS

Office Action issued by Patent Office of the People's Republic of China for Application No. 03800587.5 on Mar. 18, 2005.

(Continued)

*Primary Examiner*—Stanley Silverman
*Assistant Examiner*—Paul Wartalowicz
(74) *Attorney, Agent, or Firm*—Cantor Colburn LLP

(57) ABSTRACT

The present invention relates to a method for preparing single crystalline cerium oxide nanopowder capable of easily controlling the shape and granularity of particles. The method includes preparing cerium hydroxide by precipitating a cerium salt in the presence of a solvent mixture of organic solvent and water and hydrothermally reacting the prepared cerium hydroxide. The prepared single crystalline cerium oxide has a particle size of not less than about 30 nm and an excellent degree of dispersion.

7 Claims, 4 Drawing Sheets

FOREIGN PATENT DOCUMENTS

| | | |
|---|---|---|
| JP | 5-208816 | 8/1993 |
| JP | 8-81218 | 3/1996 |
| JP | 08119632 A | 5/1996 |
| KR | 1020010074199 A | 8/2001 |

OTHER PUBLICATIONS

"Nanostructured Cerium Oxide: Preparation and Properties of Weakly-agglomerated Powders"; Authors: Boro Djuricic and Stephen Pickering; Journal of the European Ceramic Society, vol. 19; Elsevier Science Limited; 1999; pp. 1925-1934.

"Solvothermal synthesis of cerium dioxide microcrystallites: effect of the solvent"; Authors: Eric Verdon, Michel Devalette, and Gerard Demazeau; Materials Letters, vol. 25; Elsevier; Nov. 1995; pp. 127-131.

"Preparation and Properties of Monodispersed Colloidal Particles of Lanthanide Compounds. 2. Cerium (IV)"; Authors: Wan Peter Hsu, Lena Ronnquist, and Egon Matijevic; American Chemical Society, vol. 4, No. 1; 1988; pp. 31-37.

"Crystallization and crystal growth of $CeO_2$ under hydrothermal conditions"; Authors: E. Tani, M. Yoshimura and S. Somiya; Journal of Materials Science Letters 1; Chapman and Hall Ltd.; 1982; pp. 461-462.

"Synthesis of Ultrafine Ceria Powders by Mechanochemical Processing"; Authors: Takuya Tsuzuki and Paul G. McCormick; Journal American Ceramic Society, vol. 84, No. 7; 2001; pp. 1453-1458.

PCT International Search Report; Internation application No. PCT/KR03/00756; International filing date: Apr. 14, 2003; Date of Mailing Jul. 3, 2003.

European OA dated Aug. 12, 2006.

Xia et al., J. Mater. Chem., 2001, 11, 2925-2927.

Adschiri et. al., J. Nanoparticle Research 3: 227-235, 2001.

Chengyun, W., et al.; "A novel method to prepare nanocrystalline (7nm) ceria"; Materials Science and Engineering; vol. 39; pp. 160-162; 1996.

\* cited by examiner

METHOD FOR PREPARING SINGLE CRYSTALLINE CERIUM OXIDE POWDERS

BACKGROUND OF THE INVENTION (a) Field of the Invention

The present invention relates to a method for preparing cerium oxide ($CeO_2$) nanoparticles, and more particularly to a method for preparing single crystalline cerium oxide nanopowders having a particle size of not less than about 30 nm that were difficult to synthesize in conventional hydrothermal reactions, as well as having a uniform particle shape and particle size distribution and being capable of being produced at a low temperature.

(b) Description of the Related Art

Cerium oxide ($CeO_2$) powders are multifunctional powders that are applied to abrasives, catalysts, fluorescent materials, etc. As the semiconductor industry has developed, cerium oxide powders have been spotlighted as a main component of slurry that is used in a CMP (Chemical Mechanical Polishing) process of the manufacture of semiconductors.

In many fields where cerium oxide ($CeO_2$) powders are applied, the synthesis of the cerium oxide ($CeO_2$) powders (whose particles are fine, uniform, and spherical) is urgently required, but there is no special method for preparing the cerium oxide powders except for a high-temperature, high-phase synthesis where particle size and dispersion are difficult to control. Further, there has been no research regarding the synthesis of single crystalline cerium oxide powders of not less than 30 nm by using various solution methods such as the coprecipitation method, hydrothermal synthesis, the emulsion method, etc. The solution methods easily control granularity and shape. Thus there are several difficulties in utilizing cerium oxide ($CeO_2$) powders.

It has been recognized that it is not possible to achieve excellent characteristics of ceramics in conventional methods where powders are obtained by the comminution of minerals. Liquid phase powder synthesis such as in the coprecipitation method, the sol-gel method, hydrothermal synthesis, etc. has been studied to develop novel characteristics of ceramics and obtain ceramic products having a high added value, by supplementing the drawback of the conventional procedures.

In particular, research of hydrothermal synthesis has been increased, because the hydrothermal synthesis not only has particle size and shape control characteristics of liquid phase powder synthesis, but it also controls granularity and shape of single crystalline particles with growing the single crystalline particles in the state of solution at a much lower temperature than that of solid phase reaction.

On the other hand, as liquid phase powder synthesis such as hydrothermal synthesis is conducted in a build-up manner where a small nucleus is grown into a large particle, difficulties exist in synthesizing large particles having high crystallinity even though fine particles can be comparatively easily synthesized. So as to overcome this problem, several attempts have been conducted. For instance, after the size of initial starting particles is controlled using a seed, the particles are merely grown into crystals; or high-temperature, high-pressure reaction in a supercritical state above the critical point of water is applied; or an acid and/or a base having a high concentration are used to increase solubility. But the attempts still have problems. Particularly, in the case of supercritical fluid method using supercritical water, expensive equipment capable of being applied to a high temperature reaction is required, turnover of expensive parts is short, and the control of reaction condition is difficult. Thus the industrial application of the attempts is still far off in spite of continuous studies thereof.

The powder synthesis process via a solution phase generally comprises two steps: nucleation and growth of crystals. In order to regulate the size of particles, both steps must be well controlled, and particularly in the step of nucleation, the greater the number of nucleuses, the smaller the size of particles becomes; and in the growth of crystals, secondary nucleation occurs in the case that supersaturation is high or the growth into large particles requires a lower energy barrier than that of the nucleation. Accordingly, particles having uniform and large crystals are difficult to generate. In general, to obtain large and uniform particles, the supersaturation of reaction solution must be suitably controlled. This supersaturation can be controlled mostly by the concentration of solute and the solubility of solution. Therefore, so as to synthesize desired ceramic powders, it is very important to choose a suitable solvent, and the solute's concentration, temperature, and additives for regulating solubility and regulating the shape of particles.

Matijevic et al. disclosed power synthesis of $CeO_2$ via solution phase in which hexagonal plate and spherical cerium oxide particles were prepared by sealing $Ce(SO_4)_2 \cdot 4H_2O$, $(NH_4)_4Ce(SO_4)_4 \cdot 2H_2O$, $(NH_4)_2Ce(NO_3)_6$, etc. as starting materials in a sealable Pyrex tube, heating them at a constant temperature to thereby precipitate cerium hydroxide and then calcining the cerium hydroxide at a temperature of about 600° C. (Wan Peter Hsu, Lena Roannquist, Egon Matijevic, Preparation and Properties of Monodispersed Colloidal Particles of Lanthamide Compounds. 2. Cerium(IV), *Langmuir*, 4, 31-37 (1988)).

Also, E. Tani, et al. synthesized cerium oxide powders of about 100 μm or larger by precipitating hydroxide using cerium nitrate and $NH_4OH$ as starting materials, and hydrothermally synthesizing the hydroxide together with various additives at a high temperature of about 500 to 600° C. (E Tani, M. Yoshimura, S. Somiya, Crystallization and crystal growth of $CeO_2$ under hydrothermal conditions, *J. Mater. Sci. Letters*, 1, 461-462, (1982)).

Also, Takuya Tsuzuki, et al. synthesized uniform nanosized cerium oxide by the mechanochemical process and calcination process of using cerium chloride ($CeCl_3$) and NaOH as starting materials. In the first comminution process, cerium hydroxide was synthesized via the mechanochemical reaction by comminuting cerium chloride, NaOH, and NaCl using a steel ball, and the cerium hydroxide was calcined at a temperature above 500° C., whereby a spherical nanosized cerium oxide was synthesized.

However, the synthesis of cerium oxide particles by such a mechanochemical process contains a large quantity of sodium, which is a fatal contaminant in semiconductor processes, and thus the addition of a separate washing steps is inevitable. Additionally, because of agglomeration and crystallization due to the calcination process, a large amount of energy is consumed during the comminution into nanosized particles. Therefore, with respect to its application to industrial and CMP process, problems still exist to be solved (Takuya Tsuzuki, Paul G. McCormick, Synthesis of Ultrafine Ceria Powders by Mechanochemical Processing, *J. Am. Ceram. Soc.*, 84(7), 1453-58, (2001)).

SUMMARY OF THE INVENTION

The present invention provides a method for preparing single crystalline cerium oxide nanopowders having a particle size of not less than about 30 nm that are difficult to synthesize in conventional hydrothermal reactions, by preparing cerium oxide precursors in the presence of organic solvents, in consideration of the problems of the prior arts as mentioned above.

The invention provides a method for preparing single crystalline cerium oxide nanopowder having a uniform particle shape and size distribution, and having an excellent degree of dispersion.

According to one aspect of the present invention, a method for preparing single crystalline cerium oxide ($CeO_2$) nanopowder comprises preparing a cerium hydroxide by precipitating a cerium salt in the presence of a solvent mixture of organic solvent and water, and hydrothermally reacting the prepared cerium hydroxide.

According to another aspect of the present invention, single crystalline cerium oxide having a particle size equal to or greater than about 30 nm is prepared by the method.

DETAILED DESCRIPTION OF PREFERRED EMBODIMENTS

Figure 1:
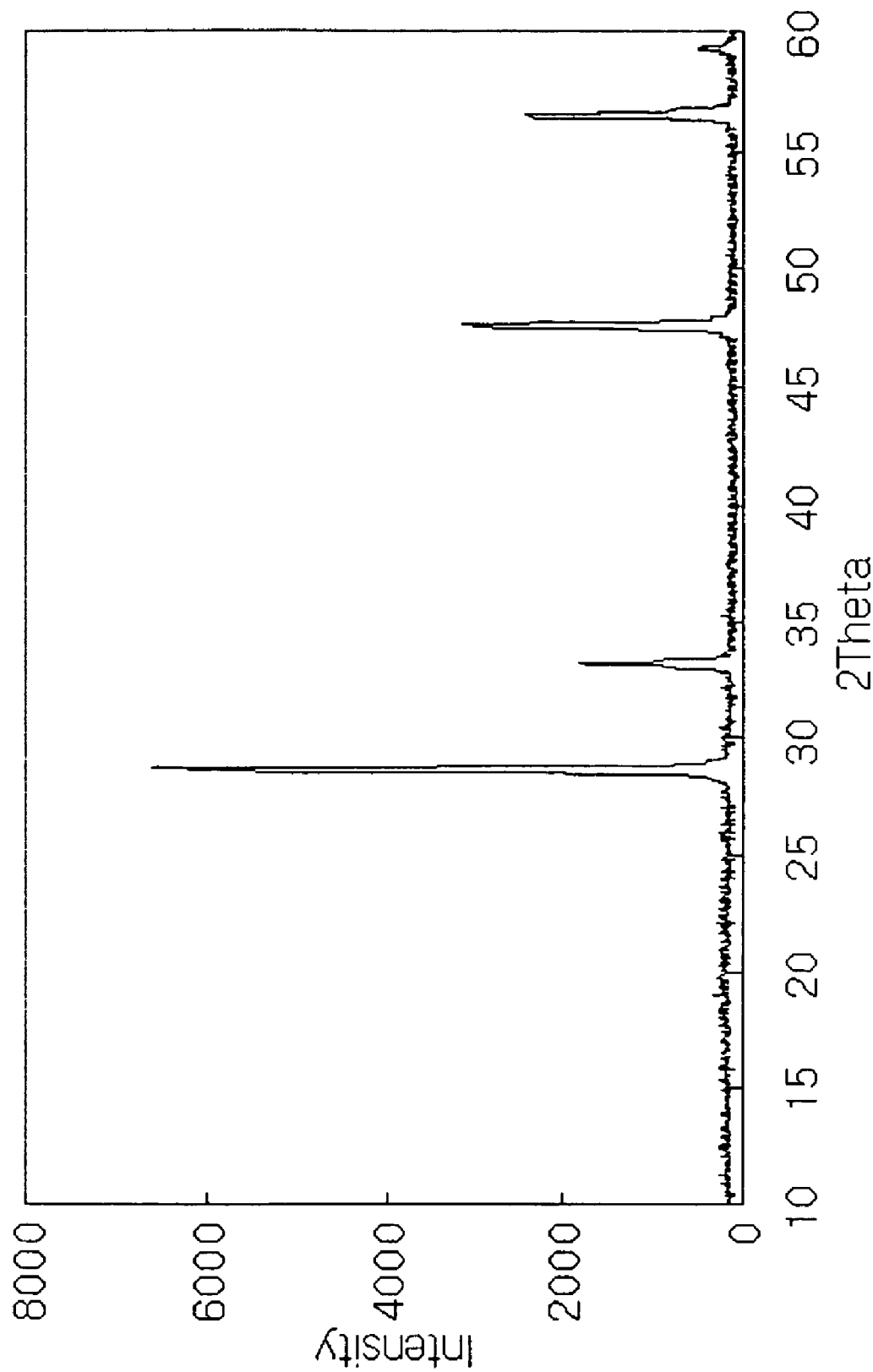
FIG. 1 shows an XRD analysis result of the cerium oxide ($CeO_2$) obtained according to exemplary embodiments of the present invention.

The present invention will hereafter be described in detail.

A method for preparing cerium oxide powder according to the present invention comprises precipitating cerium hydroxide from a cerium salt in the presence of a solvent mixture of organic solvent and water, and hydrothermally reacting the cerium hydroxide. According to the method, single crystalline cerium oxide powder having a particle size of not less than about 30 nm can be readily obtained. This invention enables the preparation of particles having a particle size of not less than about 30 nm and having a constant shape by using a solvent mixture of organic solvent and water, whereas conventional precipitation (where the cerium hydroxide is precipitated from the cerium salt by using only water as a solvent) cannot adjust the size and shape of particles. By adding a suitable organic solvent, the method controls the degree of crystallization of the cerium hydroxide powder, which makes it easy to control the granularity and shape of the cerium oxide powder. Preferably, the single crystalline cerium oxide nanopowder prepared according to the method of the invention has a particle size of about 30 nm to about 300 nm.

The hydrothermal reaction process of the cerium hydroxide synthesized in the above precipitation process includes nucleation and growth of crystals which control the shape and size of cerium oxide particles. As cerium hydroxides easily undergo a phase transition into oxides, it is difficult to control the shape and size of the final particles. For instance, hydroxide particles of a few nanometers can undergo a phase transition into oxides as they are, or into agglomerated oxides of several micrometers. Thus, to control the nucleation and growth of the crystal, the hydroxide particles to undergo phase transition into nucleus and non-crystalline hydroxides to be consumed for crystal growth are suitably mixed, and other anionic and solvent components remaining in a previous precipitation reaction control solubility and supersaturation.

The precipitation method of the invention is carried out by dissolving a cerium salt such as cerium nitrate or cerium acetate in a solvent mixture of organic solvent and water, and by adding a pH adjuster thereto to prepare a cerium hydroxide under alkali conditions. Such precipitation can be carried out by further addition of sodium chloride or urea.

Preferably, the organic solvent and water are mixed in a ratio of about 0.1:1 by weight to about 5:1 by weight. For instance, about 0.01 mol to about 0.5 mol of the cerium salt as a starting material is dissolved in about 100 ml to about 1000 ml of the solution mixture of the distilled water and the organic solvent. A pH adjuster such as NaOH, KOH, or aqueous ammonia is further added to the mixture in a small amount such that the pH of the precipitation reaction can become alkali. Therefore, the oxidation degree and crystallinity of the hydroxide are regulated. Also, the reaction temperature in the precipitation is adjusted to about 20° C. to about 80° C. to control crystallinity.

Exemplary organic solvents are the following:

i) Alcohols: methanol, ethanol, propanol, butanol, etc.

ii) Glycols: ethylene glycol, propylene glycol, butylene glycol, etc.

iii) Others: acetone, glycerol, formic acid, ethyl acetate, etc.

The organic solvent can be used alone or as a mixture of two or more organic solvents selected from the above examples.

As sources of the cerium salt, several chemical materials may be used, but their anionic components should be carefully chosen because they have a great effect on the composition of the subsequent reaction solution. In this invention, a cerium salt such as cerium nitrate, cerium acetate, etc. was used as a starting material for the precipitation reaction.

Also, the pH adjuster has a very large influence on the degree of crystallization, the size, and the oxidative state of the precipitated cerium hydroxide. Further, a certain amount of the pH adjuster remains in the precipitated cerium hydroxide, and thus it significantly influences the shape and granularity control of the cerium oxide in the subsequent hydrothermal synthesis. Therefore, NaOH, KOH, and aqueous ammonia are used as the pH adjuster of this invention.

According to the invention, the precipitated cerium hydroxide is hydrothermally reacted to thereby prepare cerium oxide powders having desired size and shape.

Preferably, the above hydrothermal reaction is carried out at a temperature lower than a conventional temperature condition, for example, about 300° C., and the reaction can be carried out with the further addition of additives such as sodium chloride, nitric acid, or urea.

For instance, about 1 g to about 5 g of the cerium hydroxide is dissolved in about 10 ml to about 50 ml, of distilled water and then hydrothermally reacted at the vapor pressure of the distilled water without applying additional pressure, and preferably at a temperature of about 180° C. to about 300° C. If necessary, one or more additives selected from the group consisting of nitric acid, urea, sodium chloride, and citric acid can be added. Stirring during this reaction can be controlled at about 0 rpm to about 300 rpm.

The method of the invention provides a way to easily control the shape and size of particles and thus provides single crystalline cerium oxide powders having a particle size of not less than about 30 nm, with an excellent degree of dispersion.

The present invention will be further described by virtue of the following examples in more detail. However, the examples are provided solely to illustrate the present invention: the invention should not be construed to be limited thereto.

EXAMPLES

A method for preparing ceramic powder via hydrothermal synthesis comprises mixing and dispersing of raw materials, hydrothermal reaction in appropriate reaction equipment, and washing and drying.

The reaction equipments used in the invention were high-pressure autoclaves of 100 ml, 2 l, and 2 gallon, and were operated using their own power or mechanical power. For washing of the reaction products, hot distilled water and ethyl alcohol were used, and the reaction products were dried for 5 hours or longer in a drier oven of 100° C. after being washed and filtered. The dried powders were observed by XRD (X-ray diffraction) analysis equipment to determine crystallinity and the degree of crystallization, and the powders were observed through an electron microscope to thereby determine the shape and size of particles. FIG. 1 shows a XRD analysis result of the cerium oxide prepared according to the method of the invention. In FIG. 1, a horizontal axis indicates the intensity of X-ray and a vertical axis indicates 2-Theta angle.

Comparative Example 1

0.02 mol of cerium nitrate (manufactured by Aldrich Co., purity 99%) was dissolved in 300 ml of distilled water to which 0.08 mol of $NH_4OH$ was added, to precipitate cerium hydroxide at a temperature of 30° C. The precipitated hydroxide was washed with distilled water, and then dispersed in distilled water so that the volume of the total solution became 100 ml.

Figure 2:
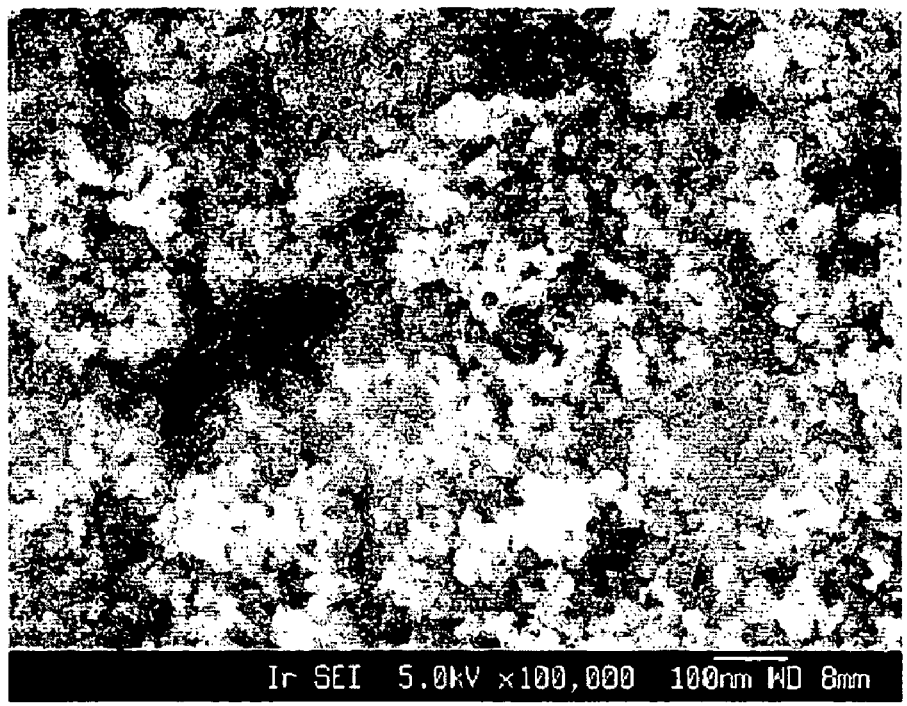
FIG. 2 shows a SEM photograph of the $CeO_2$ powders obtained in Comparative Example 1.

10 ml of this precipitated hydroxide solution was dispersed in 40 ml of distilled water and 10 ml of 1N nitric acid solution, and then hydrothermally reacted while stirring at 200 rpm at 230° C. for 12 hours. The spherical cerium oxides having an average particle size of 10 nm were thus synthesized. A SEM (Scanning Electron Microscope) photograph of the spherical cerium oxides is shown in FIG. 2. The magnification of the SEM photograph is 100,000 and the length of the scale bar shown indicates 100 nm.

Example 1

0.04 mol of cerium nitrate (manufactured by Aldrich Co., purity 99%) was dissolved in a solution mixture of 200 ml of distilled water and 100 ml of ethylene glycol, to which 160 ml of 0.5 M NaOH aqueous solution was then added to precipitate cerium hydroxide at a temperature of 50° C. The precipitated hydroxide was washed with distilled water, and then dispersed in distilled water so that the volume of the total solution became 100 ml.

Figure 3:
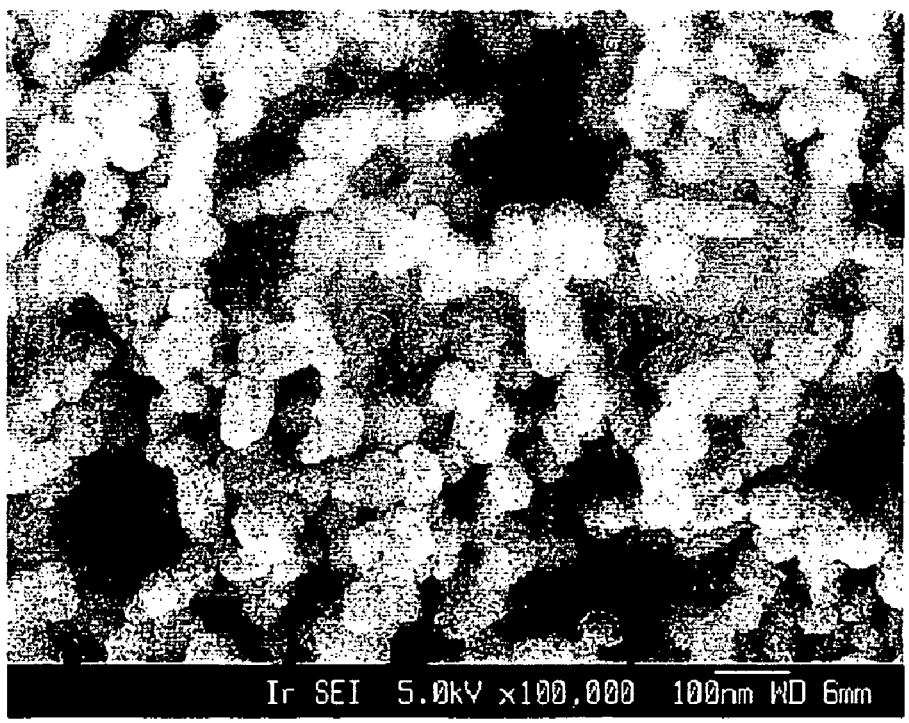
FIG. 3 shows a SEM photograph of the $CeO_2$ powders obtained in Example 1.

10 ml of this precipitated hydroxide solution was dispersed in 10 ml of distilled water and then hydrothermally reacted while stirring at 200 rpm at 230° C. for 12 hours. The spherical or navicular cerium oxides having an average particle size of 80 nm were thus synthesized. A SEM photograph of the cerium oxides is shown in FIG. 3. The magnification of the SEM photograph is 100,000 and the length of the scale bar shown indicates 100 nm.

Example 2

0.06 mol of cerium nitrate (manufactured by Aldrich Co., purity 99%) was dissolved in a solution mixture of 100 ml of distilled water and 200 ml of butanol, to which 200 ml of 0.5 M KOH aqueous solution was then added to precipitate cerium hydroxide at a temperature of 50° C. The precipitated hydroxide was washed with distilled water, and then dispersed in distilled water so that the volume of the total solution became 100 ml.

Figure 4:
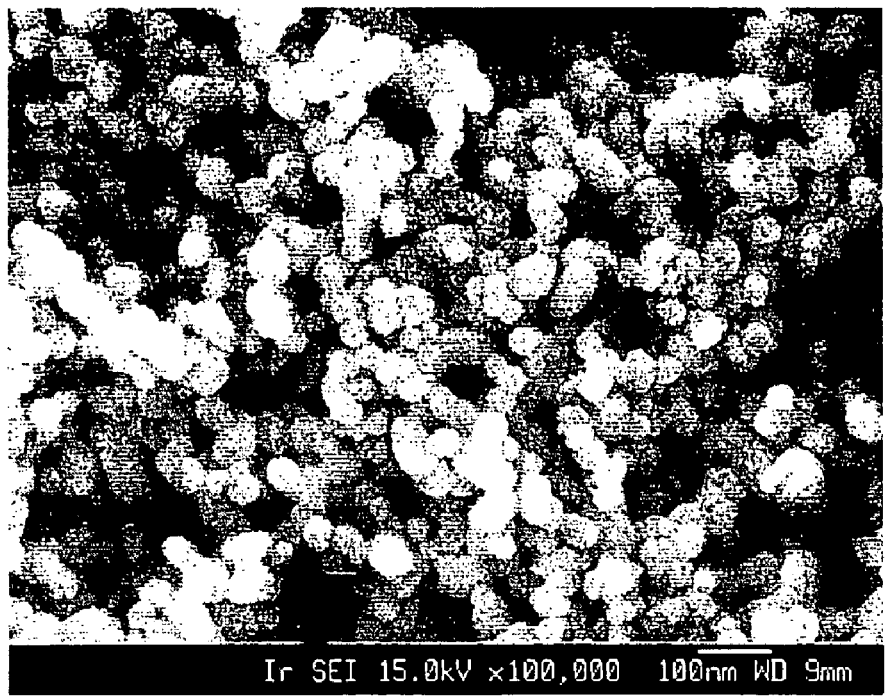
FIG. 4 shows a SEM photograph of the $CeO_2$ powders obtained in Example 2.

20 ml of this precipitated hydroxide solution was dispersed in 10 ml of distilled water and then hydrothermally reacted while stirring at 300 rpm at 230° C. for 12 hours. The spherical or navicular cerium oxides having particle sizes of 30 nm to 80 nm were thus synthesized. A SEM photograph of the cerium oxides is shown in FIG. 4. The magnification of the SEM photograph is 100,000 and the length of the scale bar shown indicates 100 nm.

Example 3

0.1 mol of cerium nitrate (manufactured by Aldrich Co., purity 99%) was dissolved in a solution mixture of 300 ml of distilled water and 200 ml of glycerol, to which 400 ml of 0.5 M KOH aqueous solution was then added to precipitate cerium hydroxide at a temperature of 80° C. The precipitated hydroxide was washed with distilled water, and then dispersed in distilled water so that the volume of the total solution became 300 ml.

Figure 5:
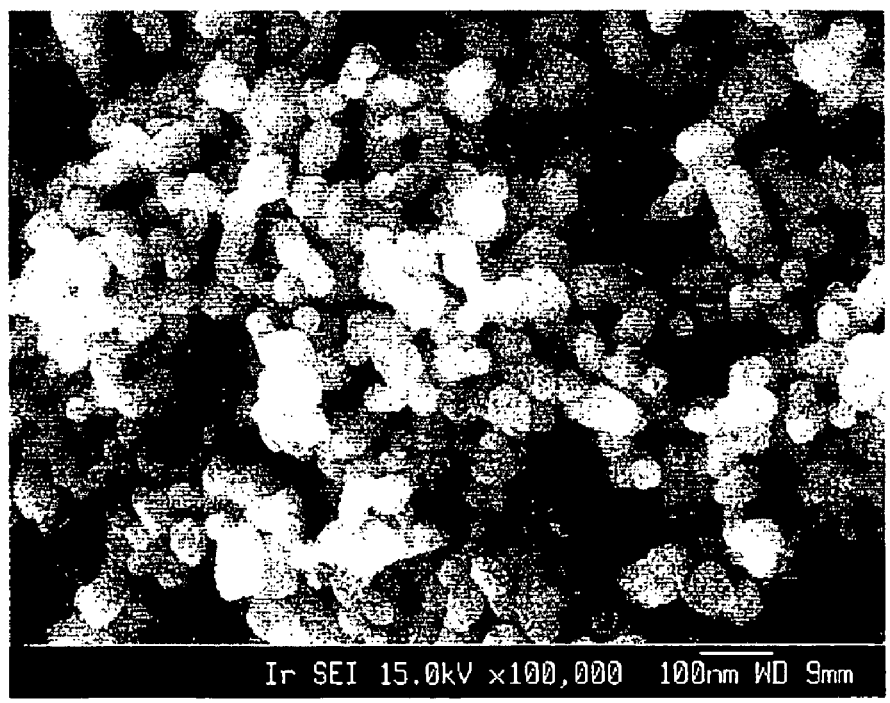
FIG. 5 shows a SEM photograph of the $CeO_2$ powders obtained in Example 3.

50 ml of the precipitated hydroxide solution was hydrothermally reacted without stirring at 200° C. for 12 hours. The spherical or navicular cerium oxides having particle sizes of 30 nm to 80 nm were thus synthesized. A SEM photograph of the cerium oxides is shown in FIG. 5. The magnification of the SEM photograph is 100,000 and the length of the scale bar shown indicates 100 nm.

Example 4

0.2 mol of cerium nitrate (manufactured by Aldrich Co., purity 99%) was dissolved in a solution mixture of 300 ml of distilled water and 200 ml of methanol, to which 500 ml of 0.5 M KOH aqueous solution was then added to precipitate cerium hydroxide at a temperature of 30° C. The precipitated hydroxide was washed with distilled water, and then dispersed in distilled water so that the volume of the total solution became 100 ml.

Figure 6:
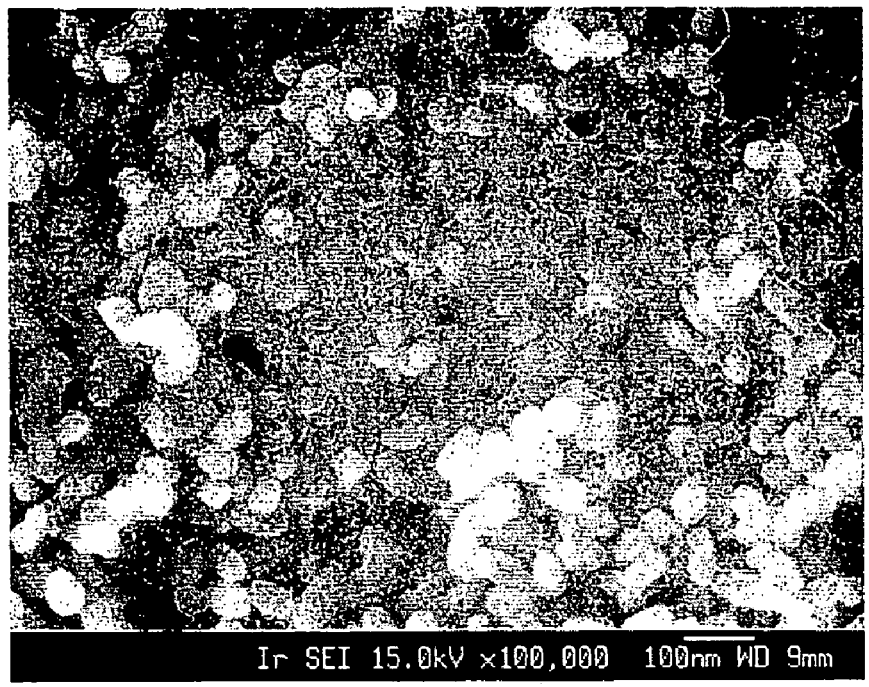
FIG. 6 shows a SEM photograph of the $CeO_2$ powders obtained in Example 4.

0.01 mol of urea was added to 50 ml of the precipitated hydroxide solution, and the hydroxide solution was then hydrothermally reacted while stirring at 200 rpm at 230° C. for 12 hours. The spherical or navicular cerium oxides having particle sizes of 30 nm to 80 nm were thus synthesized. A SEM photograph of the cerium oxides is shown in FIG. 6. The magnification of the SEM photograph is 100,000 and the length of the scale bar shown indicates 100 nm.

Example 5

0.08 mol of cerium nitrate (manufactured by Aldrich Co., purity 99%) was dissolved in a solution mixture of 200 ml of distilled water, 50 ml, of butylene glycol, and 50 ml of butanol, to which 300 ml of 0.5 M KOH aqueous solution was then added to precipitate cerium hydroxide at a temperature of 10° C. The precipitated hydroxide was washed with distilled water, and then dispersed in distilled water so that the volume of the total solution became 100 ml.

Figure 7:
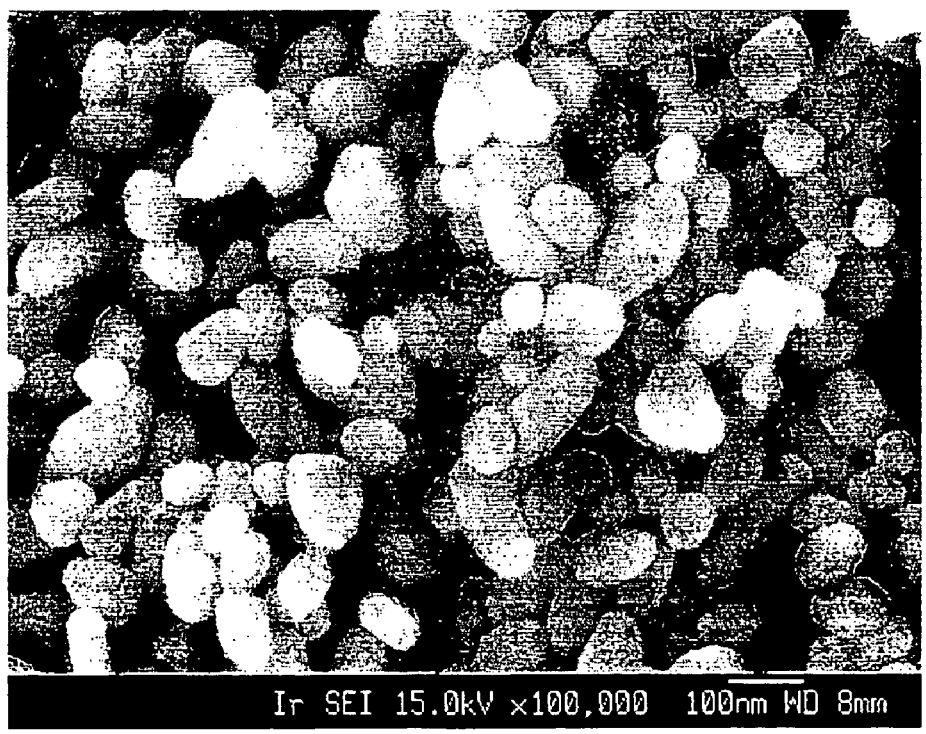
FIG. 7 shows a SEM photograph of the $CeO_2$ powders obtained in Example 5.

50 ml of the thus-precipitated hydroxide solution was hydrothermally reacted while stirring at 100 rpm at 230° C. for 12 hours. The spherical or navicular cerium oxides having particle sizes of 80-150 nm were thus synthesized. A SEM photograph of the cerium oxides is shown in FIG. 7. The magnification of the SEM photograph is 100,000 and the length of the scale bar shown indicates 100 nm.

The method of the invention provides a method for single crystalline cerium oxide ($CeO_2$) nanopowder capable of controlling the shape and granularity of particles and providing single crystalline cerium oxide powder having a particle size of not less than about 30 nm as well as having an excellent degree of dispersion.

What is claimed is:

1. A method for preparing single crystalline cerium oxide ($CeO_2$) nanopowder, comprising:
    preparing a cerium salt solution by dissolving a cerium salt into a solvent mixture consisting of organic solvent and water in a ratio of about 0.5:1 by weight to about 5:1 by weight;
    precipitating a cerium hydroxide from the cerium salt solution under alkali condition by addition of a pH adjuster selected from the group consisting of NaOH, and KOH; and
    hydrothermally reacting said cerium hydroxide;
    wherein said organic solvent consists of one or more compounds selected from the group consisting of an alcoholic organic solvent, a glycolic organic solvent, acetone, glycerol, formic acid, and ethyl acetate.

2. The method for preparing single crystalline cerium oxide ($CeO_2$) nanopowder according to claim 1 wherein said cerium salt comprises cerium nitrate or cerium acetate.

3. The method for preparing single crystalline cerium oxide ($CeO_2$) nanopowder according to claim 1 wherein said precipitation is carried out at a temperature of about 20° C. to about 80° C.

4. The method for preparing single crystalline cerium oxide ($CeO_2$) nanopowder according to claim 1 wherein said precipitation is carried out by further addition of sodium chloride or urea.

5. The method for preparing single crystalline cerium oxide ($CeO_2$) nanopowder according to claim 1 wherein said hydrothermal reaction is carried out at a temperature of about 180° C. to about 300° C.

6. The method for preparing single crystalline cerium oxide ($CeO_2$) nanopowder according to claim 1 wherein said hydrothermal reaction is carried out by further addition of sodium chloride, nitric acid, or urea.

7. The method for preparing single crystalline cerium oxide ($CeO_2$) nanopowder according to claim 1 wherein said single crystalline cerium oxide nanopowder has a particle size of about 30 nm to about 300 nm.

* * * * *